3,326,884
CURABLE CHLORINATED POLYETHYLENE CONTAINING CARBOXYLIC ESTER GROUPS
Kenneth Francis King, Newark, Del., assignor to E. I. du Pont de Nemours and Company, Wilmington, Del., a corporation of Delaware
No Drawing. Filed Dec. 19, 1963, Ser. No. 331,946
10 Claims. (Cl. 260—94.9)

This invention relates to elastomers derived from polyethylene and more particularly to polyethylene bearing a novel combination of substituent groups and to methods for the preparation and vulcanization thereof.

High-molecular polyethylenes may be converted to valuable elastomers by chlorination, usually to the extent of about 20 to about 40%. Curing of these elastomers is commonly brought about by having chlorosulfonyl groups (—$SO_2Cl$) also present in the polymer molecule along with the chlorine, forming the so-called chlorosulfonated polyethylenes, and by reacting these chlorosulfonyl groups with oxides or weak acid salts of divalent metals or with certain diamines, as described in U. S. Patents Nos. 2,416,060, 2,416,061, and 2,723,257 presumably forming in each cross links between the polymer molecules. These chlorosulfonated polyethylenes are made directly from polyethylene, as is well known, by reaction of the polyethylene with a mixture of chlorine and sulfur dioxide or with sulfuryl chloride. See U.S. Patents Nos. 2,586,363 and 2,982,759. The chlorinated polyethylenes themselves (containing no chlorosulfonyl groups) may be satisfactorily cured by heating with organic compounds capable of yielding free radicals at curing temperatures, typically peroxides, as in U.S. Patent No. 2,534,078, or by heating with sulfur, rubber vulcanization action accelerators, and Group II metal oxides, as in U.S. Patent No. 2,416,069.

All these curing methods, as well as some others of limited application, are subject to various objections. The peroxide cures are expensive, usually requiring compounds capable of in turn reacting with the free radicals generated as well as rather large amounts of the expensive peroxides themselves. Curing of the chlorosulfonated polyethylenes presents the problem of the inherent unstability of the chlorosulfonyl groups, which limits curing conditions. Furthermore, the sensitivity of the chlorosulfonyl groups to hydrolysis limits the use of these elastomers in latex form. Even so, the outstanding resistance of the cured chlorosulfonated polyethylenes to solvents, weathering, and chemical attack arising, in part, from the presence of the saturated polyethylene chain, has brought about their wide acceptance where such properties are particularly required.

Chlorinated polyethylenes containing derivatives of the sulfonic acid group other than —$SO_2Cl$ are known, as are chlorinated polyethylenes in which the —$SO_2Cl$ group is replaced by —COOH or derivatives thereof. See, for example, U.S. Patents Nos. 2,723,255, 2,852,497, 2,416,060, and 2,534,078. Unfortunately, the polyethylenes containing such other sulfonic acid derivative groups suffer from the same disadvantages of thermal unstability and propensity to hydrolyze. When carboxylic acid type groups are present instead of sulfonic acid derived groups, the chlorinated polyethylene has required the expensive free radical type of cure.

An object of the present invention is to provide a novel combination of polyethylene and substituent groups, constituting an elastomer having the desirable properties of chlorinated and chlorosulfonated polyethylene. Another object is to provide methods of preparing and curing this novel combination. A further object is to provide new polyethylene based elastomer compositions. A still further object is to provide new sulfur curable polyethylene elastomers. Other objects will appear hereinafter.

These and other objects of the present invention are accomplished by chlorinated polyethylene containing the substituent groups carboxylic ester, —COOR, in which the alcohol residue, R, is aliphatic and ethylenically unsaturated, that is, an alkenyl radical, and contains from 3 to 20 carbon atoms. Generally, the amount of chlorination of the polyethylene required to give good elasticity is from 35 to 100 chlorine atom substituents for an average of each 350 carbon atoms in the ethylene polymer chain. The amount of carboxylic ester groups required to impart good curing with sulfur will vary according to the structure of the polyethylene employed and the amount of its chlorination. Generally, from 1 to 10 groups for each 350 carbon atoms in the polymer chain will produce a chlorinated polyethylene which is readily curable with sulfur. As the number of these groups increases, curing becomes easier but good cures may be obtained even with the smaller numbers.

The polyethylene base for the elastomer compositions of the present invention may be any which has been disclosed as suitable for making elastomers by chlorosulfonation. See U.S. Patent No. 2,586,363 for the branched (low density) types and No. 2,982,759 for the linear types, including methods for making them. The molecular weight will usually be above 10,000 but not so high (usually not about 200,000) that it is impractical, because of high viscosity, to react it in dilute solutions. The density of the preferred linear polyethylenes is between about 0.940 and about 0.960.

The elastomeric esters are readily made by first chlorocarboxylating a solution of solid polyethylene of either linear or branch type with oxalyl chloride or phosgene. See Kharasch and Brown, Journal of the American Chemical Society, 64, 329 (1942) and British Patent No. 547,101. The product is then chlorinated in the conventional manner.

These reactions are conveniently carried out in the same solution with a solvent substantially inert to chlorine, such as carbon tetrachloride, trichloroethylene, a trichlorobenzene such as 1,2,4-trichlorobenzene, or a chlorofluorohydrocarbon such as trichlorofluoromethane. Catalysts which function by giving free radicals such as organic peroxides (benzoyl peroxide) and azo bis(cyanoalkanes) (azo bis(isobutyronitrile)) are used as catalysts for both reactions. Suitable temperatures for the reactions are between 100 and 200° C. When the starting material is a linear polyethylene, which is preferred, such temperatures are usually required, at least at the start, to keep it in solution. The temperatures may be attained by using a high-boiling solvent such as trichlorobezene or by operating with a low-boiling solvent at super-atmospheric pressure.

The chlorocarboxylated polyethylenes thus prepared are conveniently converted to the corresponding esters by adding the unsaturated alcohol, preferably in excess, to the solutions in which the chlorocarboxylated products have been prepared and promoting the reaction between the alcohol and the —COCl groups by further heating, if necessary. The esterified carboxylated polyethylene, or ester for brevity, can be isolated by precipitation from solution, repeated if necessary, by means of a non-solvent such as ethyl or methyl alcohol or acetone; or it can be isolated, if the solvent is readily volatile, like carbon tetrachloride, by drum drying preferably under the conditions shown in U.S. Patent No. 2,923,979.

The alcoholic part, R, of the unsaturated ester groups of the substituted polyethylenes of the present invention are illustrated in Examples 1 and 2 by allyl and oleyl radicals in which, respectively, there are three carbons and terminal unsaturation, and 18 carbons and unsaturation between the ninth and tenth carbons forming an unbranched chain. The chain may also be branched and may correspond to a secondary or tertiary alcohol, as well as primary. The unsaturation may be at any location along the chain. Additional representative alcoholic residues are obtainable from monohydric alcohols as follows: crotyl, omega undecylenyl, 9-eicosenyl alcohols, 1-butene-3-ol, 3-hexene-1-ol, 1-heptene-4-ol and 2-methyl-2-heptene-6-ol.

The ratio of unsaturated carboxylic ester groups to carbon atoms in the polymer chain determines the ease and "tightness" of curing. A satisfactory vulcanizate is obtained when the ratio is as low as one group per 350 carbon atoms. The ratio of chlorine to carbon atoms in the polymer chain determines the rubbery properties. When less than 35 chlorine atoms per 350 carbon atoms are present (20% chlorine by weight), the product lacks elasticity; while with more than 100 chlorines (42% by weight) the product, although somewhat elastic, is too stiff for many purposes.

The curing of the subject elastomers may be readily accomplished with sulfur and the vulcanization accelerators and other agents used for the vulcanization of natural rubber. The same materials and same proportions as used with natural rubber apply here, as illustrated, in part, in Table I. For a good summary on this subject applying to the sulfur vulcanization of natural rubber, and thus of the elastomers of the present invention, see Encyclopedia of Chemical Technology, Kirk and Othmer, New York, 1953, vol. 11, page 892. The elastomers of the present invention can also be readily cured by organic peroxides which yield free radicals under curing conditions, with or without free radical acceptors, such as are given in U.S. Patent No. 2,958,672. See also U.S. Patent No. 2,534,078. Good cures may be obtained with small amounts of peroxides and without the acceptors, as shown in Table II. Hence the usual high cost of peroxide cures, previously referred to, does not apply in the present invention.

The following examples are illustrative of the present invention. Parts and percents are by weight unless otherwise noted.

EXAMPLE 1

A. A carboxylated polyethylene is prepared by dissolving 150 grams of a linear polyethylene of density 0.955, melt index 4, in 3 liters of 1,2,4-trichlorobenzene at 110° C., adding 22 grams of oxalyl chloride and 2.0 grams of benzoyl peroxide each dissolved in 10 milliliters of the same solvent, and continuing heating at 110° C. for 1.5 hours. Chlorine is then introduced at a rate of 45 grams per hour, after adding 0.01 gram of 1,1'-azobisisobutyronitrile, until the chlorine content is calculated to have reached the desired value of 31%. The solution then degassed by a stream of nitrogen.

Without isolating the resulting chlorocarboxylated polyethylene from its solution, 250 milliliters (222 grams) of allyl alcohol is added to 2.5 liters of the solution and agitated at room temperature for 16 hours. The resulting allyl ester containing polymer is precipitated by adding methanol, and then is dried by milling. It is a light-colored polymer with an inherent viscosity of 1.15 in chloroform and contains 31.1% chlorine and 0.018 mole of carboxylic ester groups per 100 grams. This corresponds to 62 chlorine atoms for 350 carbon atoms in the polymer chain. The curing properties of the product in peroxide and in accelerated sulfur formulations are given in the following tables.

B. The procedure of section A is repeated using a branched chain polyethylene of density 0.91. An analogous product is obtained. Curing results are shown in Table I.

EXAMPLE 2

A solution of chlorocarboxylated polyethylene in 1,2,4-trichlorobenzene is prepared by the method used in Example 1 except that more chlorine is introduced. A mixture of 2 liters of this solution and 125 grams of oleyl alcohol are stirred at 60° C. for 24 hours. The resulting oleyl ester containing polymer is isolated by precipitating and re-precipitating with methanol as in Example 1. After drying by milling, it contains 35.9% chlorine and has an inherent viscosity of 0.76 in chloroform. It contains, based on its analysis of its infrared spectra, 0.016 mole of carboxylic ester groups per 100 grams. This corresponds to about 265 carbon atoms in the chain for each carboxylic ester group. The results obtained by this polymer are illustrated in Table I.

The products of Examples 1 and 2, in the uncured state, have good heat stability. Infra red spectra show no change in the —COO— group on heating in air for 1 hour at 175° C. On the other hand, under the same conditions, several chlorosulfonated polyethylenes lost 50 to 86% of the sulfur from their —$SO_2Cl$ groups. Similarly, the products of Examples 1 and 2 are stable to hydrolysis under mild conditions and hence form stable latices. These are mady by dissolving the rubber in a solvent such as benzene, dispersing this solution in water and distilling off the solvent as described (for chlorosulfonated polyethylene) in U. S. Patent No. 2,809,950.

TABLE I.—SULFUR CURES

|  | Example 1-A | Chlorosulfonated Polyethylene | Example 1-B | Example 2 | Chlorinated Polyethylene |
|---|---|---|---|---|---|
| Formulation: |  |  |  |  |  |
| Polymer, parts by weight | 100 | 100 | 100 | 100 | 100 |
| Carbon Black, HAF |  |  | 50 | 50 | 50 |
| Carbon Black, SRF | 40 | 40 |  |  |  |
| Zinc Oxide | 2 | 2 | 5 | 5 | 5 |
| Tetramethyl Thiuram Disulfide | 0.8 | 0.8 | 0.2 | 0.2 | 0.2 |
| 2-Benzothiazolyl Disulfide | 0.2 | 0.2 | 0.8 | 0.8 | 0.8 |
| Sulfur | 2 | 2 | 2 | 2 | 2 |
| 30 Minute Cure at 153° C.: |  |  |  |  |  |
| Modulus (100%) | 420 | 810 |  |  | 505 |
| Tensile | 2,300 | 2,250 | 1,660 | 1,510 | 935 |
| Elongation | 460 | 320 | 60 | 60 | 450 |
| Permanent Set | 46 | 22 | 3 | 3 | 166 |

TABLE II.—PEROXIDE CURES

| | Example 1-A | Example 1-B | Chlorinated Polyethylene | | Chlorosulfonated Polyethylene |
|---|---|---|---|---|---|
| Formulation: | | | | | |
| Polymer | 100 | 100 | 100 | 100 | 100 |
| Dibasic Lead Phthalate | 40 | 16.3 | 40 | 40 | 40 |
| Titanium Dioxide | 35 | 35 | 35 | 35 | 35 |
| Clay | 25 | 25 | 25 | 25 | 25 |
| 2,5-Bis(t-butyl peroxy)-2,5-dimethyl-hexane | 1.5 | 1.5 | 1.5 | 3 | 1.5 |
| Metaphenylene Bis Maleimide | | | | 3 | |
| 30 Minute Cure at 153° C.: | | | | | |
| Modulus (100%) | 1,025 | 1,580 | 360 | 610 | 256 |
| Tensile | 1,210 | 1,580 | 1,055 | 1,375 | 870 |
| Elongation | 120 | 100 | 600 | 220 | 700 |
| Permanent Set | 6 | 6 | 116 | 23 | 151 |
| Resilience | | 68 | | 51 | |
| Percent Volume Swell—7 days in $H_2O$ at 70° C | 0.6 | | 2.0 | | |
| Percent Volume Swell—7 days in oil at 100° C | 55 | | 205 | | |

Table I shows that the product of Examples 1, 1–B and 2 are readily cured by sulfur, accelerator and zinc oxide and that the "tightness" of the cure may be varied greatly by the selection of the curing agents. In comparison with a chlorosulfonated linear polyethylene containing 34.5% chlorine and 1.0% sulfur and cured with the same sulfur formulation, the product of Example 1–A gives similar vulcanizates. It should be understood, however, that both vulcanizates may be greatly altered by changes in formulation. A chlorinated polyethylene containing 34.5% chlorine is little affected by a sulfur formulation which gives a very tight cure with both the allyl and oleyl esters of the present invention.

Table II shows the product of Example 1 well cured by simple formulations containing no bismaleimide free radical acceptor and only half as much peroxide curing agent as is required to give an inferior cure for the corresponding chlorinated polyethylene (like that in Table I). Note the superior resilience and permanent set for the product of the present invention, as well as the superior water and oil resistance when compared with chlorinated polyethylene in the same formulation.

The chloroboxylated polyethylene can be esterified as in the foregoing examples with other unsaturated aliphatic alcohols containing from 3 to 20 carbon atoms and similar results will be obtained. Likewise, other polyethylenes having different chlorine content can be treated in the manner just exemplified or analogously to obtain improved polyethylene based elastomers.

The present invention affords a new elastomer, which may be easily, economically, and completely cured and which has greater stability at elevated temperatures than the corresponding chlorosulfonated polyethylenes. The elastomers of the present invention also have the resistance to solvents, weathering, and chemical attack characteristic of the cured chlorinated and chlorosulfonated polyethylenes and accordingly have similar uses.

As many widely different embodiments of this invention may be made without departing from the spirit and scope thereof, it is to be understood that this invention is not limited to the specific embodiments thereof except as defined in the appended claims.

What is claimed is:

1. Chlorinated polyethylene containing, for an average of 350 carbon atoms in the polymer chain, from 1 to 10 carboxylic ester groups in which the alcohol residue is aliphatic and ethylenically unsaturated and contains from 3 to 20 carbon atoms.

2. The chlorinated polyethylene as recited in claim 1, wherein the amount of chlorination of said polyethylene is an elastomer producing amount.

3. A curable composition consisting essentially of chlorinated polyethylene elastomer and a vulcanizing amount of carboxylic ester groups in which the alcohol residue is aliphatic and ethylenically unsaturated and contains from 3 to 20 carbon atoms.

4. A curable composition consisting essentially of polyethylene having from 35 to 100 chlorine atoms for an average of 350 carbon atoms in the polymer chain and a vulcanizing amount of carboxylic ester groups in which the alcohol residue is aliphatic and ethylenically unsaturated and contains from 3 to 20 carbon atoms.

5. The curable composition as recited in claim 4, wherein from 1 to 10 groups of said carboxylic ester groups are present.

6. The vulcanizate of claim 4.

7. The curable composition as recited in claim 4, wherein said polyethylene is substantially linear.

8. The curable composition as recited in claim 4 being sulfur curable.

9. The curable composition as recited in claim 4 being peroxide curable.

10. The curable composition as recited in claim 4, wherein said alcohol residue is allyl alcohol residue.

References Cited

UNITED STATES PATENTS 2,416,061   2/1947   McAlevy et al. _____ 260—27
2,534,078  12/1950   Strain _____ 260—79.3

JOSEPH L. SCHOFER, *Primary Examiner.*

L. EDELMAN, *Assistant Examiner.*